Aug. 16, 1955    C. MILLER ET AL    2,715,512
WATER PRESSURE RELIEF VALVE FOR FAUCET COUPLING
Filed March 9, 1954

INVENTORS
CHARLES MILLER
PAT ROMANELLI
BY
Mock & Blum
ATTORNEYS

United States Patent Office 2,715,512
Patented Aug. 16, 1955

2,715,512

WATER PRESSURE RELIEF VALVE FOR FAUCET COUPLING

Charles Miller and Pat Romanelli, New York, N. Y., assignors to Ram Domestic Products Company, Englewood, N. J., a partnership Application March 9, 1954, Serial No. 415,076

2 Claims. (Cl. 251—148)

The present invention relates to pressure relief devices and in particular to a pressure relief valve for a faucet coupling.

It has recently been found desirable to attach water inlet pipes or hoses of certain appliances such as washing machines directly to sink faucets instead of installing special plumbing for this purpose. Special coupling members have been devised for such attachment, being adapted for connection to the appliance inlet pipe at one end and to the mouth of the faucet spigot at the other end.

Most automatic clothes washing and dish washing machines operate under relatively high water pressure, and in their operation produce a high back pressure. Consequently, when the washing operation is completed and the faucet is shut off, the flexible water inlet pipe of the appliance is filled with water under pressure. When the coupling member is detached from the faucet, therefore, this built-up pressure causes the water in the inlet pipe to spurt out of the coupling with considerable force, generally spraying the surrounding walls and floor as well as the user.

It is an object of the present invention to provide pressure release means in the faucet coupling through which the excess water may be drained at a controlled rate and in a controlled direction to release the accumulated pressure before the coupling is removed from the faucet.

Another object of the invention is the provision of a pressure release means of the type described which is completely housed within the body of the faucet adaptor and are made of a few parts of sturdy construction which are not likely to be damaged in normal use.

Other objects and advantages of the invention will be readily apparent in the course of the following specification when taken in connection with the accompanying drawings, in which.

Figure 1:
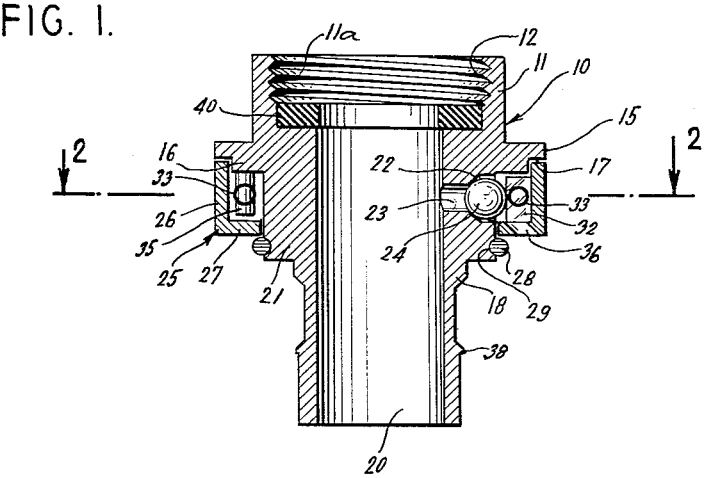
Fig. 1 is a vertical section through the center of a faucet coupling incorporating the pressure release means of the invention, the valve means being shown in closed position.

Referring to the drawings in detail, the coupling member is shown having a cast integral body portion 10 having a cylindrical hollow upper section 11 having a sunken well or bore 11a containing internal threading 12 for attachment to the external threading 13 around the mouth of a faucet spigot 14. Immediately below the upper section 11 is an intermediate section comprising a top circumferential flange 15 of greater diameter than the upper section 11 and integral with a depending flange 16 of smaller diameter, a shoulder 17 being formed between the flanges 15 and 16. The intermediate section is integral with a depending bottom section 18 in the form of a nipple and adapted to receive the flexible pipe or hose 19 leading to a washing machine or similar appliance.

The bore 11a of the upper section 11 communicates with an extension bore 20 which extends longitudinally through the central section of the coupling and opens through the bottom of the nipple 18. The intermediate section has a lower body portion 21 of lesser diameter than the flange 16 which section 21 is provided with a valve seat 22 and a laterally extending bore 23 of relatively small diameter connecting said valve seat with the bore 20. A metallic ball valve 24 is loosely contained in the valve seat 22 and is sized to block the outer end of the bore 23 to prevent the passage of water therethrough.

A collar 25 is also mounted on the adaptor, this collar having an upstanding wall 26 of circular outer configuration and an annular bottom wall 27. The upstanding wall 26 of collar 25 is of the same external diameter as the flange 15 and is mounted with its upper end slidably abutting the shoulder 17 formed between the flanges 15 and 16 so that the collar 25 is guided for concentric rotation around the coupling body. A resilient split ring 28 which is snap-fit within a slot 29 beneath the collar 25 holds said collar in such mounted position.

Figure 2:
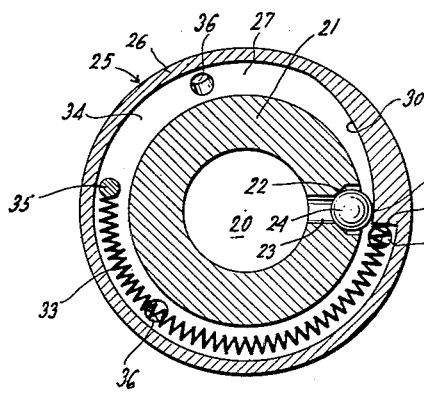
Fig. 2 is a section taken along line 2—2 of Fig. 1.
Figure 3:
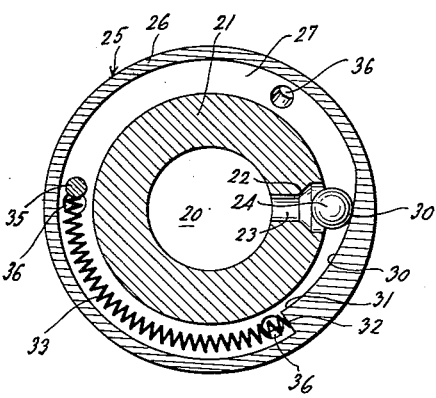
Fig. 3 is a section similar to Fig. 2 but showing the valve means in open position.
Figure 4:
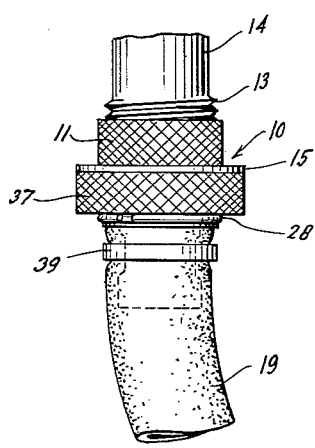
Fig. 4 is an elevation showing the faucet coupling attached to a faucet and to an inlet pipe of an appliance.

As shown in Figs. 2 and 3 the internal circumferential surface of the collar 25 is gradually widened at one section or segment thereof to provide an inwardly-projecting cam surface 30 which at its widest point 31 is abruptly ended to form a shoulder 32 connecting it to the inner circumferential surface of said collar. As shown in Fig. 2, the widest end 31 of the cam surface 30 is of sufficient width to press the ball valve 24 firmly into the valve seat 22 when it is brought into abutment with said ball. A compression spring 33 is mounted in the annular recess 34 formed between the upstanding wall 26 of collar 25 and the lower body portion 21 of the coupling intermediate section, said spring 33 abutting the shoulder 32 at one end, and a fixed post 35 which depends from the flange 16 at the other end. The tension of the compression spring 33 normally urges the collar 25 in a counter-clockwise direction so that the widest point 31 of cam 30 is in abutment with the ball 24, the ball being thus pressed into the valve seat 22, and the friction between the ball 24 and cam surface 30 preventing the collar 25 from moving further in a counter-clockwise direction. In other words, the ball valve 24 projects out of said valve seat a sufficient distance to prevent the widest portion 31 of cam surface 30 from moving past it as the collar 25 turns in a counter-clockwise direction. This position of Fig. 2 represents the normal closed position of the valve 24 in which bore 23 is shut off to the passage of water.

The bottom wall 27 of the cam 25 has a plurality of water outlet openings 36 which extend angularly outwardly as shown in Fig. 1 from the annular recess 34 to the outside atmosphere. After the appliance has been in operation and water pressure is built up in the appliance hose 19, the collar 25 may be grasped manually by its knurled outer surface 37 and turned in a clockwise direction to move the cam surface 30 relative to the ball valve 24 until a narrow portion of said cam surface 30 is opposite said ball valve as shown in Fig. 3. The pressure of the trapped water in the bore 20 then presses the ball valve 24 out of its seat 22 permitting water to flow from the bore 20 through bore 23 and valve seat 22 into the annular recess 34 and out through the water outlet openings 36 into the sink. The collar 25 is held in this release position until all of the excess water pressure has been released thereby permitting the coupling to be safely detached from the faucet spigot 14.

The drawings are substantially to scale and reference is made thereto for further disclosure. It will be noted that the coupling bottom section or nipple 18 may be formed with the usual annular projection or rib 38 which cooperates with the usual ring 39 for locking the appliance pipe 19 to the coupling. In addition, the conventional resilient washer or annular gasket 40 may be seated in the bore 11a for providing a water-tight seal between the coupling and the faucet spigot.

While a preferred embodiment of the invention has been shown and described herein, it is obvious that numerous changes, additions and omissions may be made in the invention without departing from the spirit and scope thereof.

What is claimed is:

1. In a faucet coupling having an inlet opening, an outlet opening and a through bore connecting said inlet and outlet openings, valve means for releasing water under pressure from said bore, said valve means comprising an auxiliary passageway leading from said bore to an auxiliary outlet opening in said coupling, a ball valve interposed intermediate said auxiliary passageway and having a valve seat, and a valve control member turnably mounted on said coupling and having an inclined cam surface movable relative to said ball valve for selectively pressing said ball valve into its valve seat and releasing it therefrom, and spring means normally urging said control member to a position in which said cam surface presses said ball valve into said seat.

2. In a faucet coupling having an inlet opening, an outlet opening and a through longitudinal bore connecting said inlet and outlet openings, valve means for releasing water under pressure from said bore, said valve means comprising a valve seat in the outer peripheral surface of said coupling, a lateral bore connecting said valve seat with said longitudinal bore, a ball valve sized to fit within said valve seat to close off the end of said lateral bore, an annular collar concentrically and turnably mounted around said coupling in alinement with said valve seat and ball valve, said collar having an internal cam surface of gradually increasing width, having a wide portion at one end and a narrow portion at the other end, an internal annular recess, and at least one water outlet opening communicating with said annular recess, said cam surface at its wide end being positioned to press said ball valve into said valve seat and being sized at its narrow end to release said ball valve from said valve seat, and spring means normally urging said collar to a position in which the wide end of said cam surface is in contact with said ball valve.

References Cited in the file of this patent

UNITED STATES PATENTS

| | | |
|---|---|---|
| 851,878 | Gilman | Apr. 30, 1907 |
| 1,732,918 | Sutton | Oct. 22, 1929 |
| 2,657,709 | Gillerstrom | Nov. 3, 1953 |